(12) United States Patent
Saad-Falcon et al.

(10) Patent No.: US 12,625,845 B2
(45) Date of Patent: May 12, 2026

(54) RESPONDING TO A USER QUERY USING MACHINE LEARNING

(71) Applicant: ADOBE INC., San Jose, CA (US)

(72) Inventors: Jon Saad-Falcon, Savannah, GA (US); Joseph D. Barrow, Alexandria, VA (US); Varun Manjunatha, San Diego, CA (US); Anusha Prakash, San Jose, CA (US); Ryan A. Rossi, San Jose, CA (US); Franck Dernoncourt, Spokane, WA (US); Alexa F Siu, San Jose, CA (US); Ani Nenkova Nenkova, Philadelphia, PA (US); Seunghyun Yoon, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/667,690

(22) Filed: May 17, 2024

(65) Prior Publication Data

US 2025/0355833 A1     Nov. 20, 2025

(51) Int. Cl.
*G06F 16/14*        (2019.01)

(52) U.S. Cl.
CPC ................................. *G06F 16/148* (2019.01)

(58) Field of Classification Search
CPC ...................................................... G06F 16/148
USPC ........................................................ 707/769
See application file for complete search history.

(56) References Cited

U.S. PATENT DOCUMENTS

| | | | | | |
|---|---|---|---|---|---|
| 5,751,286 | A | * | 5/1998 | Barber | ................ G06F 16/5862 |
| | | | | | 707/E17.025 |
| 12,299,081 | B1 | * | 5/2025 | Asi | ........................ G06F 16/345 |
| 2004/0215664 | A1 | * | 10/2004 | Hennings | .............. G06F 16/957 |
| 2009/0287698 | A1 | * | 11/2009 | Marmaros | ........... G06F 16/9558 |
| | | | | | 707/999.005 |
| 2016/0210294 | A1 | * | 7/2016 | Komarov | ............ G06F 16/9024 |
| 2022/0342920 | A1 | * | 10/2022 | Miller | ................... G06T 11/206 |
| 2022/0382975 | A1 | * | 12/2022 | Gu | ......................... G06F 40/216 |
| 2023/0306201 | A1 | * | 9/2023 | Bayomi | ................. G06F 40/30 |

OTHER PUBLICATIONS

Asai, et al., "Task-aware Retrieval With Instructions", arXiv preprint arXiv:2211.09260v2 [cs.CL] Dec. 19, 2022, 25 pages.
Dasigi, et al., "A Dataset of Information-Seeking Questions and Answers Anchored in Research Papers", arXiv preprint arXiv:2105.03011v1 [cs.CL] May 7, 2021, 12 pages.

(Continued)

*Primary Examiner* — Cam Y T Truong
(74) *Attorney, Agent, or Firm* — F. CHAU & ASSOCIATES, LLC

(57) ABSTRACT

A method, apparatus, non-transitory computer readable medium, and system for data processing include obtaining a query relating to a document and identifying metadata for the document based on the query, where the metadata describes a structure including a plurality of portions of the document. Some embodiments including generating, using a machine learning model, a retrieval command based on the query and the metadata, selectively retrieving at least one of the plurality of portions of the document based on the retrieval command, and generating, using the machine learning model, a response to the query based on the at least one of the plurality of portions of the document.

13 Claims, 11 Drawing Sheets

(56)             References Cited

OTHER PUBLICATIONS

Feng, et al., "Knowledge Refinement via Interaction Between Search Engines and Large Language Models", arXiv preprint arXiv:2305.07402v2 [cs.CL] May 21, 2023, 14 pages.

Flesch, "A new readability yardstick", Journal of Applied Psychology, 32(3):221-33, Jun. 1948, available at https://pubmed.ncbi.nlm.nih.gov/18867058/.

Gao, et al., "Precise Zero-Shot Dense Retrieval without Relevance Labels", arXiv preprint arXiv:2212.10496v1 [cs.IR] Dec. 20, 2022, 11 pages.

Gulcehre, et al., "Reinforced Self Training (ReST) for Language Modeling", arXiv preprint arXiv:2308.08998v2 [cs.CL] Aug. 21, 2023, 23 pages.

Kwiatkowski, et al., "Natural Questions: A Benchmark for Question Answering Research", Transactions of the Association for Computational Linguistics, 7:453-466, 2019, 14 pages.

Landeghem, et al., "Document Understanding Dataset and Evaluation (DUDE)", arXiv preprint arXiv:2305.08455v3 [cs.CV] Sep. 11, 2023, 22 pages.

Li, et al., "API-Bank: A Comprehensive Benchmark for Tool-Augmented LLMs", arXiv preprint arXiv:2304.08244v2 [cs.CL] Oct. 25, 2023, 15 pages.

Liang, et al., "TaskMatrix.AI: Completing Tasks by Connecting Foundation Models with Millions of APIs," arXiv preprint arXiv:2303.16434v1 [cs.AI] Mar. 29, 2023, 27 pages.

Lin, et al., "How to Train Your DRAGON: Diverse Augmentation Towards Generalizable Dense Retrieval", arXiv preprint arXiv:2302.07452v1 [cs.IR] Feb. 15, 2023, 15 pages.

Mathew, et al., "DocVQA: A Dataset for VQA on Document Images", arXiv preprint arXiv:2007.00398v3 [cs.CV] Jan. 5, 2021, 23 pages.

Mialon, et al., "Augmented Language Models: a Survey", arXiv preprint arXiv:2302.07842v1 [cs.CL] Feb. 15, 2023, 33 pages.

Parisi, et al., "TALM: Tool Augmented Language Models", arXiv preprint arXiv:2205.12255v1 [cs.CL] May 24, 2022, 6 pages.

Patil, et al., "Gorilla: Large Language Model Connected with Massive APIs", arXiv preprint arXiv:2305.15334v1 [cs.CL] May 24, 2023, 18 pages.

Pereira, et al., "Visconde: Multi-document QA with GPT-3 and Neural Reranking", arXiv preprint arXiv:2212.09656v1 [cs.CL] Dec. 19, 2022, 11 pages.

Press, et al., "Measuring and Narrowing the Compositionality Gap in Language Models", arXiv preprint arXiv:2210.03350v3 [cs.CL] Oct. 17, 2023, 25 pages.

Rajpurkar, et al., "SQuAD: 100,000+ Questions for Machine Comprehension of Text", arXiv preprint arXiv:1606.05250v3 [cs.CL] Oct. 11, 2016, 10 pages.

Schick, et al., "Toolformer: Language Models Can Teach Themselves to Use Tools", arXiv preprint arXiv:2302.04761v1 [cs.CL] Feb. 9, 2023, 17 pages.

Wang, et al., "Glue: A Multi-Task Benchmark and Analysis Platform for Natural Language Understanding", arXiv preprint arXiv:1804.07461v3 [cs.CL] Feb. 22, 2019, 20 pages.

Yao, et al., "ReAct: Synergizing Reasoning and Acting in Language Models", arXiv preprint arXiv:2210.03629v3 [cs.CL] Mar. 10, 2023, 33 pages.

Yu, "Augmentation-Adapted Retriever Improves Generalization of Language Models as Generic Plug-In", arXiv preprint arXiv:2305.17331v1 [cs.CL] May 27, 2023, 14 pages.

Zhao, et al., "Retrieving Multimodal Information for Augmented Generation: A Survey", arXiv preprint arXiv:2303.10868v3 [cs.CL] Dec. 1, 2023, 21 pages.

Zheng, et al., "Judging LLM-as-a-Judge with MT-Bench and Chatbot Arena", arXiv preprint arXiv:2306.05685v4 [cs.CL] Dec. 24, 2023, 29 pages.

Zhuang, et al., "Toolqa: A Dataset for LLM Question Answering with External Tools", arXiv preprint arXiv:2306.13304v1 [cs.CL] Jun. 23, 2023, 25 pages.

* cited by examiner

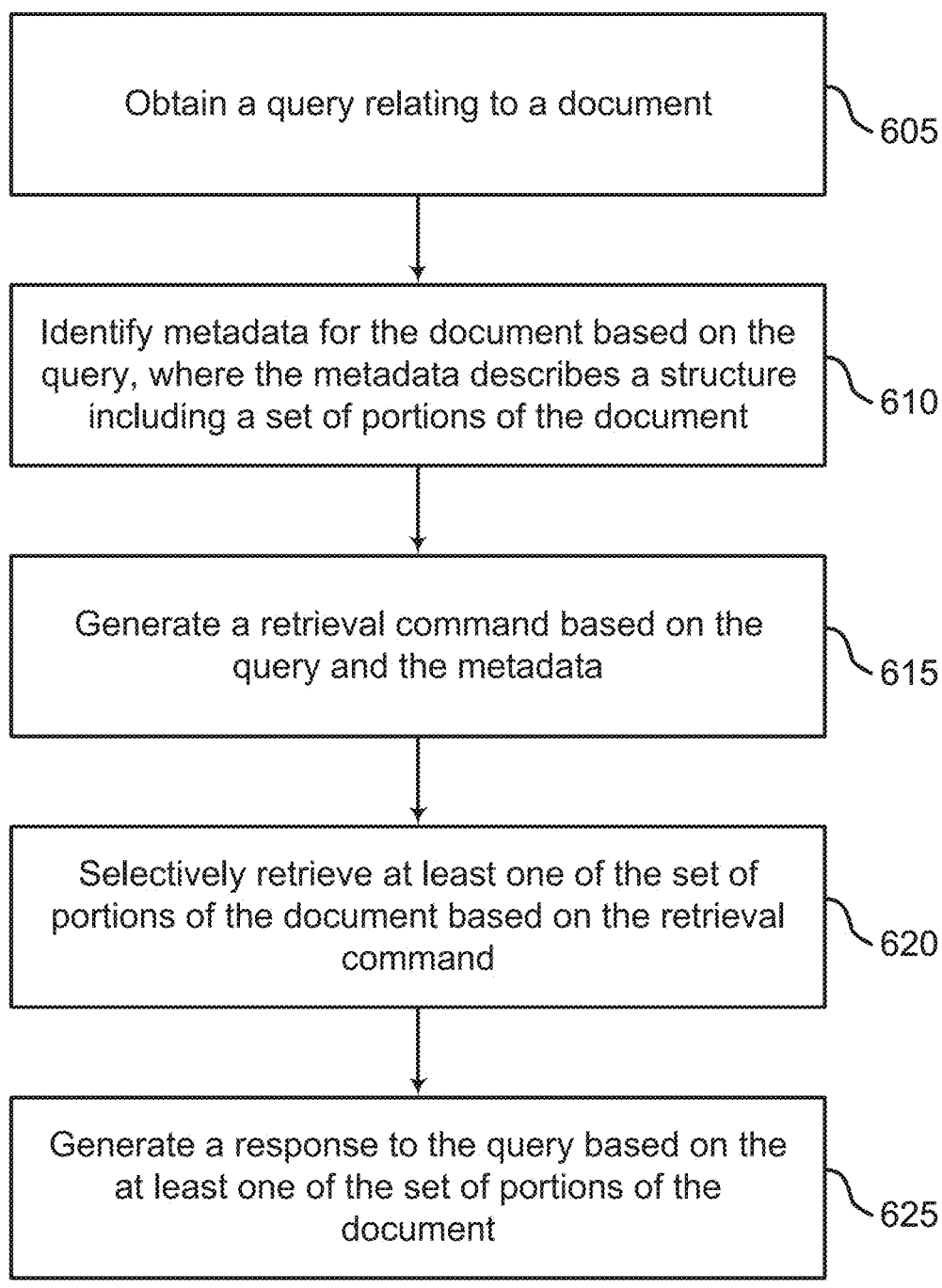

Obtain a query relating to a document ⟍605

Identify metadata for the document based on the query, where the metadata describes a structure including a set of portions of the document ⟍610

Generate a retrieval command based on the query and the metadata ⟍615

Selectively retrieve at least one of the set of portions of the document based on the retrieval command ⟍620

Generate a response to the query based on the at least one of the set of portions of the document ⟍625

Query: "Can you summarize the key takeaways from pages 5-7?" — 810

Document Context: — 815

805

Pages

[1, 2, 3, 4, 5, 6, 7, 8, 9, 19, 11]

...

Section

Title: "2 Related Works"

Pages: [2, 3]

Section

Title: "2.1 Machine Learning Models"

Pages: [2]

...

Table

Caption: Table 1

Pages: [4]

Available Functions: fetch_pages, fetch_section, search, ... — 820 fetch_pages(pages: [5, 6, 7]) — 825

800

| Function | Description |
|---|---|
| fetch_pages | Get the text included in the pages listed |
| fetch_sections | Get the text included in the section listed |
| fetch_figure | Get the text included in the figure caption listed |
| fetch_table | Get the text included in the table caption listed |
| retrieve | Issue a natural language query over the document, and fetch relevant chunks |

900

| Function | Compose prefix string during aggregation |
|---|---|
| fetch_pages | Fetching text from Page <page_number_query> of provided document: |
| fetch_sections | Fetching text from Section <section_name> of provided document: |
| fetch_figure | Fetching caption of Figure <figure_name> of provided document: |
| fetch_table | Fetching data from cells of Table <table_name> of provided document: |
| retrieve | Fetching text by searching for <search_query> from document: |

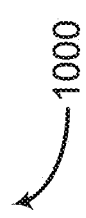

Query: "Can you summarize the key takeaways from pages 5-7?"

～1105

Page 5:
...length less than 10 pages, to ensure that there is sufficient but not excessive...

Page 6:
...the query embedding. We then feed each page's text as context for answering...

Page 7:
...1. The overall quality of the question, such as its difficulty, clarity,...

～1110

Response: The key takeaways of...

RESPONDING TO A USER QUERY USING MACHINE LEARNING

BACKGROUND

The following relates generally to natural language processing, and more specifically to responding to a user query using machine learning. Natural language processing (NLP) is a field of machine learning that focuses on understanding, interpreting, and generating human language using computers. NLP can include tasks such as text parsing, sentiment analysis, named entity recognition (NER), language translation, text summarization, speech recognition, and language generation. In some cases, NPL techniques are used to generate a response to a user query. In some cases, the user query relates to a document, and a machine learning language model uses contents of the document as an information context for generating the response.

However, machine learning language models have context window sizes, or a number of words that the machine learning language model is capable of parsing in connection with each other. In some cases, a number of words in a document exceeds a machine learning language model's context window size, and the machine learning language model is then unable to accurately use the document as context for generating a response to a query about the document, leading to a generation of an inaccurate response. There is therefore a need in the art for a data processing system that generates a more accurate response to a query about a document.

SUMMARY

Embodiments of the present disclosure provide a data processing system that identifies metadata for a document based on a query relating to the document. In some cases, the metadata describes a structure including a plurality of portions of the document. In some cases, the data processing system generates, using a machine learning model, a retrieval command based on the query and the metadata, selectively retrieves at least one of the plurality of portions of the document based on the retrieval command, and generates, using the machine learning model, a response to the query based on the at least one of the plurality of portions of the document.

In some cases, using the machine learning model to generate the retrieval command enables a relevant portion of the document to be retrieved without human supervision or intervention, which increases an efficiency of the response generation process. Furthermore, in some cases, because the response is generated based on the retrieved portion of the document, rather than the entire document, the machine learning model processes a number of words that fit within the context window size of the machine learning model, thereby increasing an accuracy of the response.

Still further, in some cases, by generating the response based on portions of the document that are determined to be a most pertinent context for the response, the data processing system avoids using potentially misleading portions of the document as a response context and therefore provide a more accurate response to a user query than conventional data processing systems can provide, regardless of a context window size of the machine learning model.

A method, apparatus, non-transitory computer readable medium, and system for data processing are described. One or more aspects of the method, apparatus, non-transitory computer readable medium, and system include obtaining a query relating to a document; identifying metadata for the document based on the query, wherein the metadata describes a structure including a plurality of portions of the document; generating, using a machine learning model, a retrieval command based on the query and the metadata; selectively retrieving at least one of the plurality of portions of the document based on the retrieval command; and generating, using the machine learning model, a response to the query based on the at least one of the plurality of portions of the document.

An apparatus and system for data processing are described. One or more aspects of the apparatus and system include at least one memory; at least one processor executing instructions stored in the at least one memory; a database including a document stored in the at least one memory; and a machine learning model comprising machine learning parameters stored in the at least one memory, the machine learning model trained to generate a retrieval command for retrieving at least one of a plurality of portions of the document based on a query and metadata of the document and to generate a response to the query based on the at least one of the plurality of portions of the document, wherein the metadata describes a structure including a plurality of portions of the document.

BRIEF DESCRIPTION OF THE DRAWINGS

FIG. 6 shows an example of a method for responding to a query relating to a document according to aspects of the present disclosure.

FIG. 10 shows an example of a table of appended retrieval functions according to aspects of the present disclosure.

FIG. 11 shows an example of question answering with selected context according to aspects of the present disclosure.

DETAILED DESCRIPTION

Figure 1:
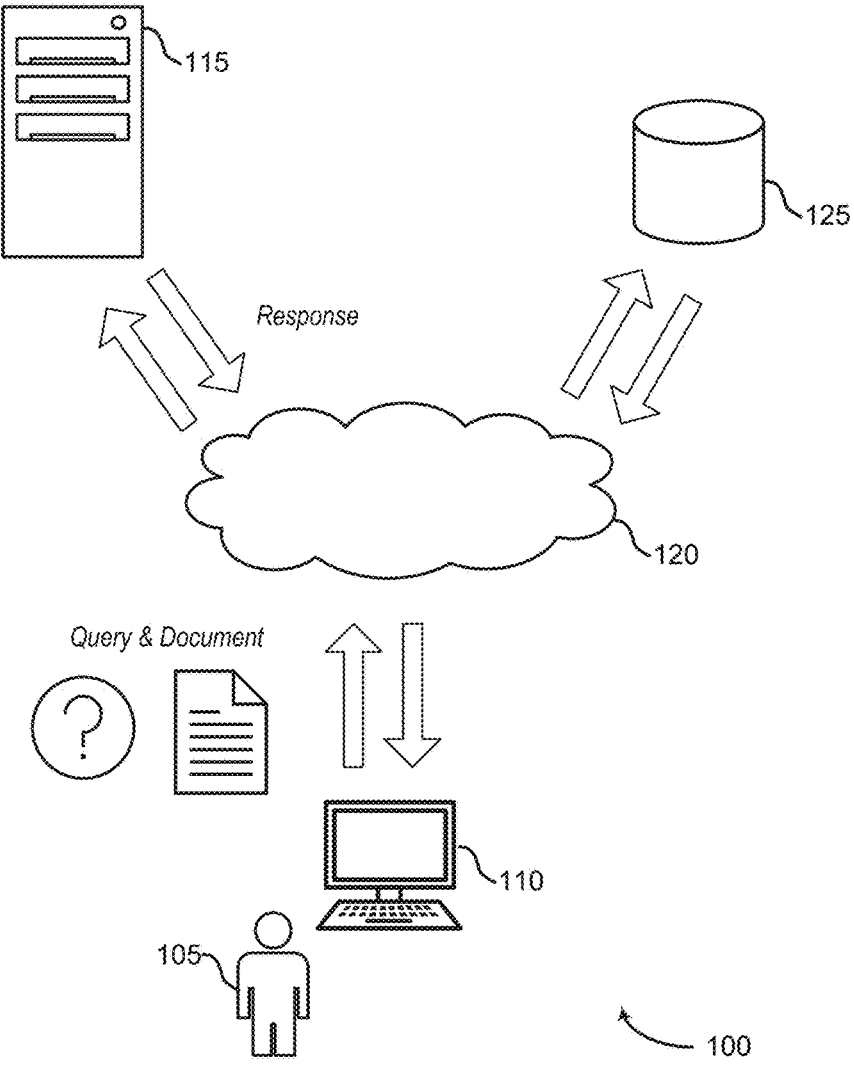
FIG. 1 shows an example of a data processing system according to aspects of the present disclosure.

Natural language processing (NLP) is a field of machine learning that focuses on understanding, interpreting, and generating human language using computers. NLP can include tasks such as text parsing, sentiment analysis, named entity recognition (NER), language translation, text summarization, speech recognition, and language generation. In some cases, NPL techniques are used to generate a response to a user query. In some cases, the user query relates to a document, and a machine learning language model uses contents of the document as an information context for generating the response.

However, machine learning language models have context window sizes, or a number of words that the machine learning language model is capable of parsing in connection with each other (for example, using an attention mechanism). In some cases, a number of words in a context document exceeds a machine learning language model's context window size, and the machine learning language model is then unable to accurately use the document as context for generating a response to a query about the document, leading to a generation of an inaccurate response.

Conventional data processing systems may deploy different strategies to identify relevant context when a document does not fit in a limited context window of a machine learning language model. Some conventional approaches rely on a pre-retrieval step to fetch relevant context from documents by representing the document as plain text chunks that may share some similarity with the user query and may potentially contain an answer to a user query about the document.

However, many document types, such as web pages, PDFs, presentations, and so on, are structured documents including rich structure, and representing a structured document as plain text is often incongruous with a user's mental model of the structured document, leading to queries that, to users, may be trivially answerable, but are unanswerable by conventional data processing systems.

For instance, given user queries such as "Can you summarize the key takeaways from pages 5-7?" and "What year [in table 3] has the maximum revenue?", in which a structure of a document is explicitly ("pages 5-7") or implicitly ("in table 3") referenced, a representation of document structure is helpful to identify a salient context for generating a response to the user queries, and a conventional approach of considering the document merely as plain text therefore discards the salient context.

Embodiments of the present disclosure provide a data processing system that identifies metadata for a document based on a query relating to the document. In some cases, the metadata describes a structure including a plurality of portions of the document. In some cases, the data processing system generates, using a machine learning model, a retrieval command based on the query and the metadata, selectively retrieves at least one of the plurality of portions of the document based on the retrieval command, and generates, using the machine learning model, a response to the query based on the at least one of the plurality of portions of the document.

In some cases, using the machine learning model to generate the retrieval command enables a relevant portion of the document to be retrieved without human supervision or intervention, which increases an efficiency of the response generation process. Furthermore, in some cases, because the portion of the document is retrieved based on structural metadata, the data processing system is able to obtain a salient information context for the machine learning model. Still further, in some cases, because the response is generated based on the retrieved portion of the document, rather than the entire document, the machine learning model processes a number of words that fit within the context window size of the machine learning model, thereby increasing an accuracy of the response.

Finally, in some cases, by generating the response based on portions of the document that are determined to be a most pertinent context for the response, the data processing system avoids using potentially misleading portions of the document as a response context and therefore provide a more accurate response to a user query than conventional data processing systems can provide, regardless of a context window size of the machine learning model.

An embodiment of the present disclosure is used in a question-answering context. In an example, a user asks the data processing system (for example, via a dialogue box of a user interface provided by the data processing system) to summarize information included in tables 3 and 4 of a document uploaded by the user to the data processing system (for example, via the user interface).

In the example, the data processing system generates a metadata representation of the document, where the metadata includes a representation of structural elements of the document (such as sections, figures, tables, etc.) and locations (such as page numbers) of the structural elements, such that the metadata can be parsed to retrieve portions of the document (e.g., groups of words) corresponding to the structural elements. In the example, the data processing system uses a machine learning model to generate a retrieval command that includes an executable function to retrieve a portion of the document based on the metadata, where the machine learning model selects the executable function based on a likelihood that the executable function will result in a query-relevant portion of the document being retrieved.

In the example, the data processing system executes the function included in the retrieval command to retrieve the relevant portion(s) of the document (in this case, tables 3 and 4 and text descriptions of tables 3 and 4 included in the document). The data processing system provides the retrieved portions of the document to the machine learning model, and the machine learning model generates a response to the query using the retrieved portions of the document as an information context.

Figure 4:
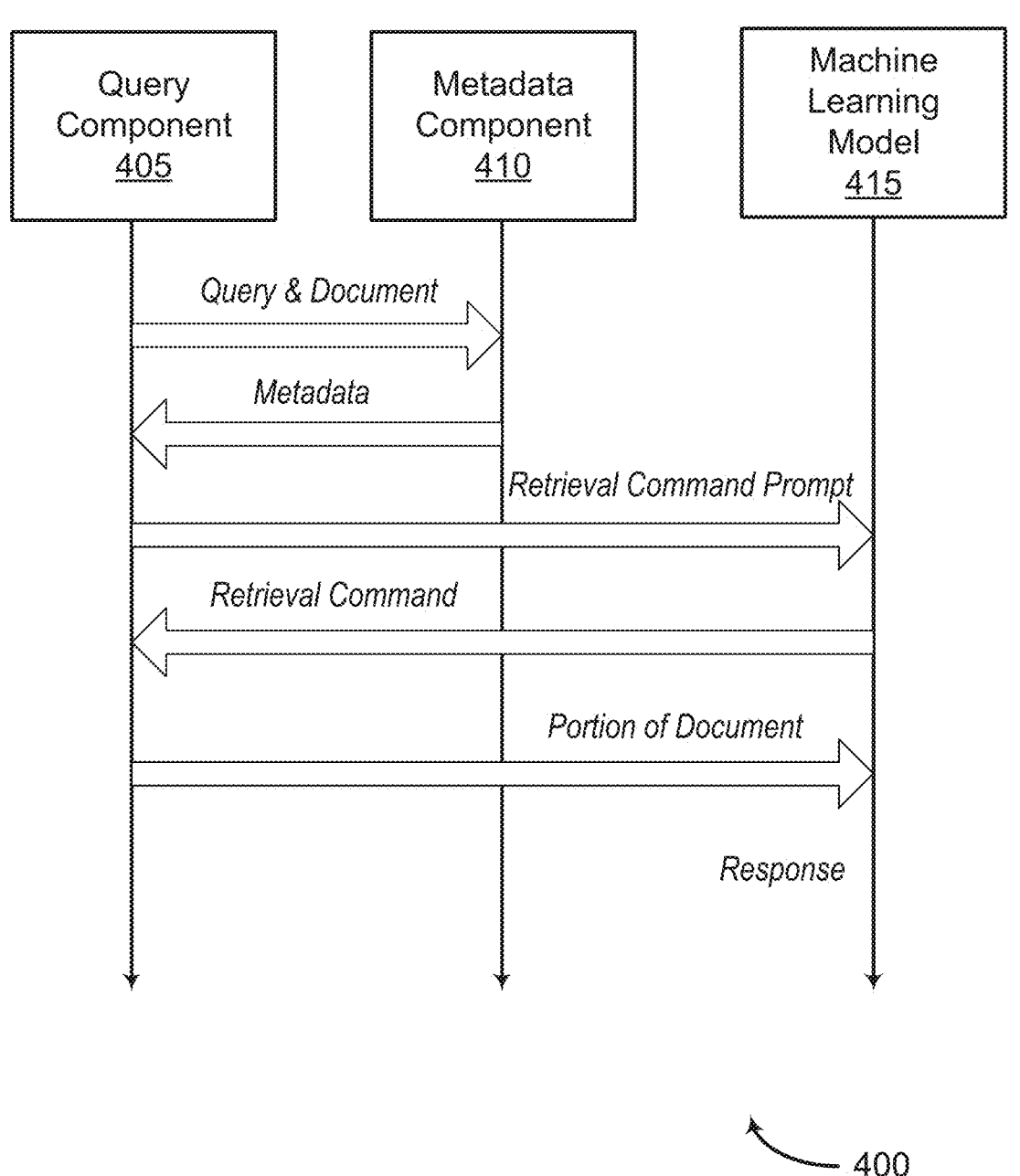
FIG. 4 shows an example of data flow in a data processing apparatus according to aspects of the present disclosure.
Figure 5:
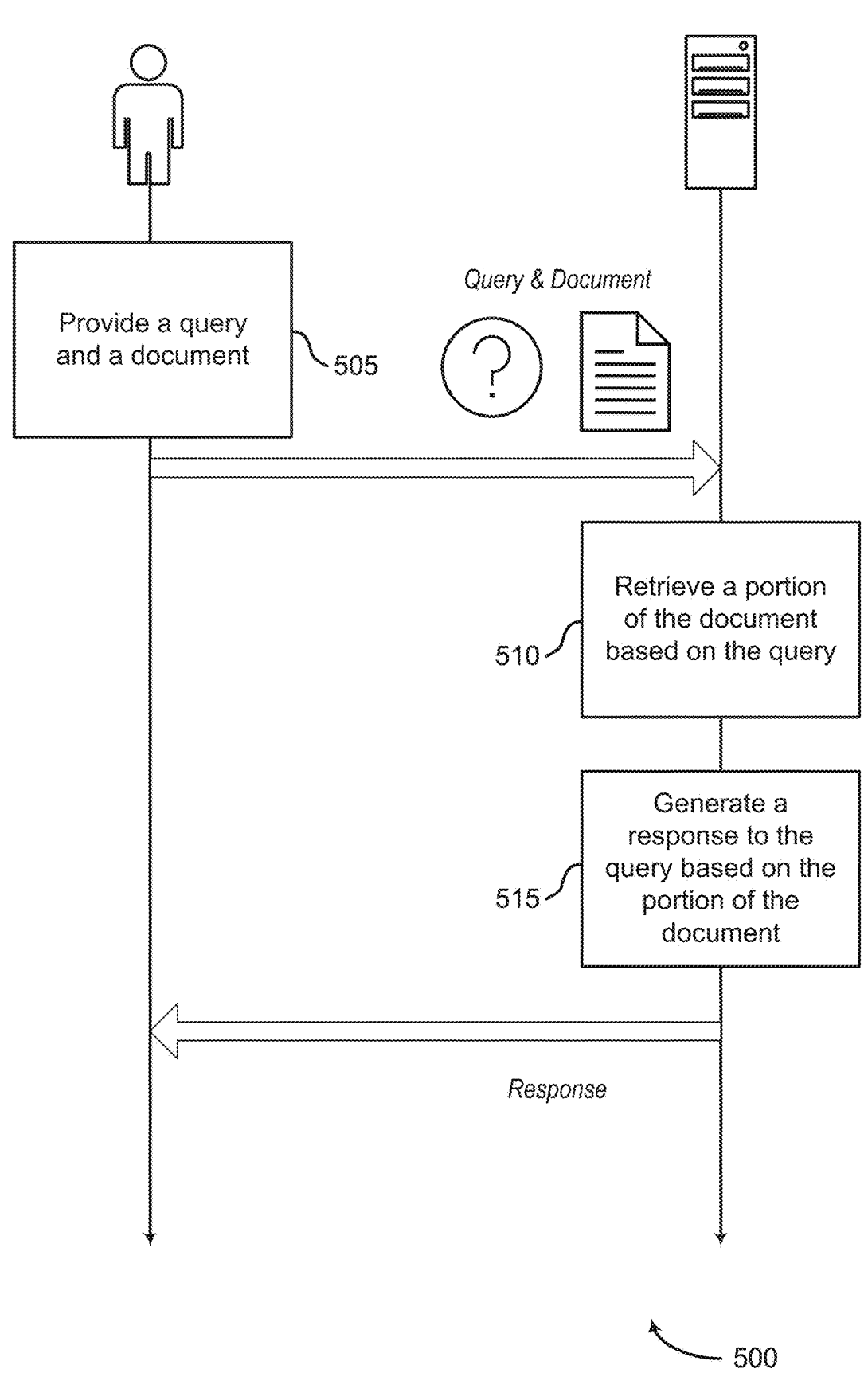
FIG. 5 shows an example of a method for retrieving a portion of a document according to aspects of the present disclosure.

Further example applications of the present disclosure in a question-answering context are provided with reference to FIGS. 1, 5, and 6. Details regarding the architecture of the data processing system are provided with reference to FIGS. 1-4. Details regarding a process for generating a response to a user query are described with reference to FIGS. 5-11.

Data Processing System

A system and an apparatus for data processing are described with reference to FIGS. 1-4. One or more aspects of the system and the apparatus include at least one memory; at least one processor executing instructions stored in the at least one memory; a database including a document stored in the at least one memory; and a machine learning model comprising machine learning parameters stored in the at least one memory, the machine learning model trained to generate a retrieval command for retrieving at least one of a plurality of portions of the document based on a query and metadata of the document and to generate a response to the query based on the at least one of the plurality of portions of the document, wherein the metadata describes a structure including a plurality of portions of the document.

Some examples of the system and the apparatus further include a query component configured to selectively retrieve the at least one of the plurality of portions of the document based on the retrieval command. In some examples, the query component is further configured to identify a context window size of the machine learning model. In some examples, the query component is further configured to select the at least one of the plurality of portions of the document based on the context window size. In some examples, the query component is further configured to generate a retrieval command prompt including a predefined set of retrieval command categories, wherein the retrieval command is generated based on the retrieval command prompt.

Some examples of the system and the apparatus further include a metadata component configured to identify the metadata for the document based on the query. In some examples, the metadata component is further configured to generate a hierarchical tree of structural elements based on text of the document.

FIG. 1 shows an example of a data processing system 100 according to aspects of the present disclosure. The example shown includes data processing system 100, user 105, user device 110, data processing apparatus 115, cloud 120, and database 125.

Referring to FIG. 1, according to some aspects, user 105 provides a query and a document to data processing apparatus 115, where the query relates to the document, via a user interface provided on user device 110 by data processing apparatus 115. According to some aspects, data processing apparatus 115 generates metadata for the document, retrieves a portion of the document based on the metadata and the query, generates a response to the query based on the retrieved portion of the document, and displays the response to user 105 via user device 110.

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface, a text-based user interface, or a combination thereof) provided by data processing apparatus 115. In some aspects, the user interface allows information to be communicated between user 105 and data processing apparatus 115.

According to some aspects, a user device user interface enables user 105 to interact with user device 110. In some embodiments, the user device user interface includes an audio device, such as an external speaker system, an external display device such as a display screen, or an input device (e.g., a remote-control device interfaced with the user interface directly or through an I/O controller module). In some cases, the user device user interface is a graphical user interface, a text-based user interface, or a combination thereof.

Data processing apparatus 115 is an example of, or includes aspects of, the corresponding element described with reference to FIGS. 2-4. According to some aspects, data processing apparatus 115 includes a computer-implemented network. In some embodiments, the computer-implemented network includes a machine learning model (such as the machine learning model described with reference to FIGS. 2-4). In some embodiments, data processing apparatus 115 also includes at least one processor, a memory subsystem, a communication interface, an I/O interface, at least one user interface component, and a bus. Additionally, in some embodiments, data processing apparatus 115 communicates with user device 110 and database 125 via cloud 120.

In some cases, data processing apparatus 115 is implemented on a server. A server provides at least one function to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via at least one protocol, such as hypertext transfer protocol (HTTP), simple mail transfer protocol (SMTP), file transfer protocol (FTP), simple network management protocol (SNMP), and the like. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Figure 2:
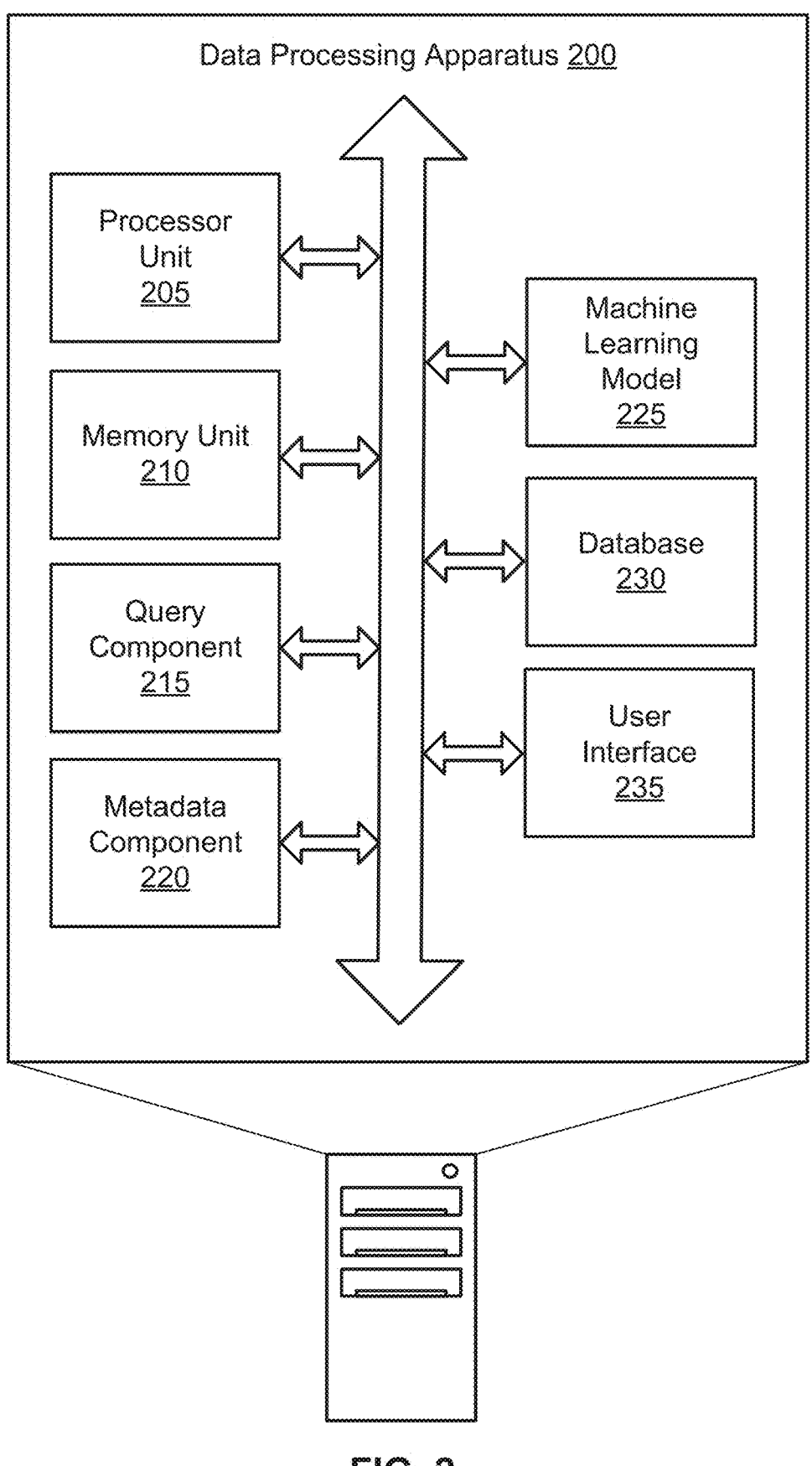
FIG. 2 shows an example of a data processing apparatus according to aspects of the present disclosure.
Figure 3:
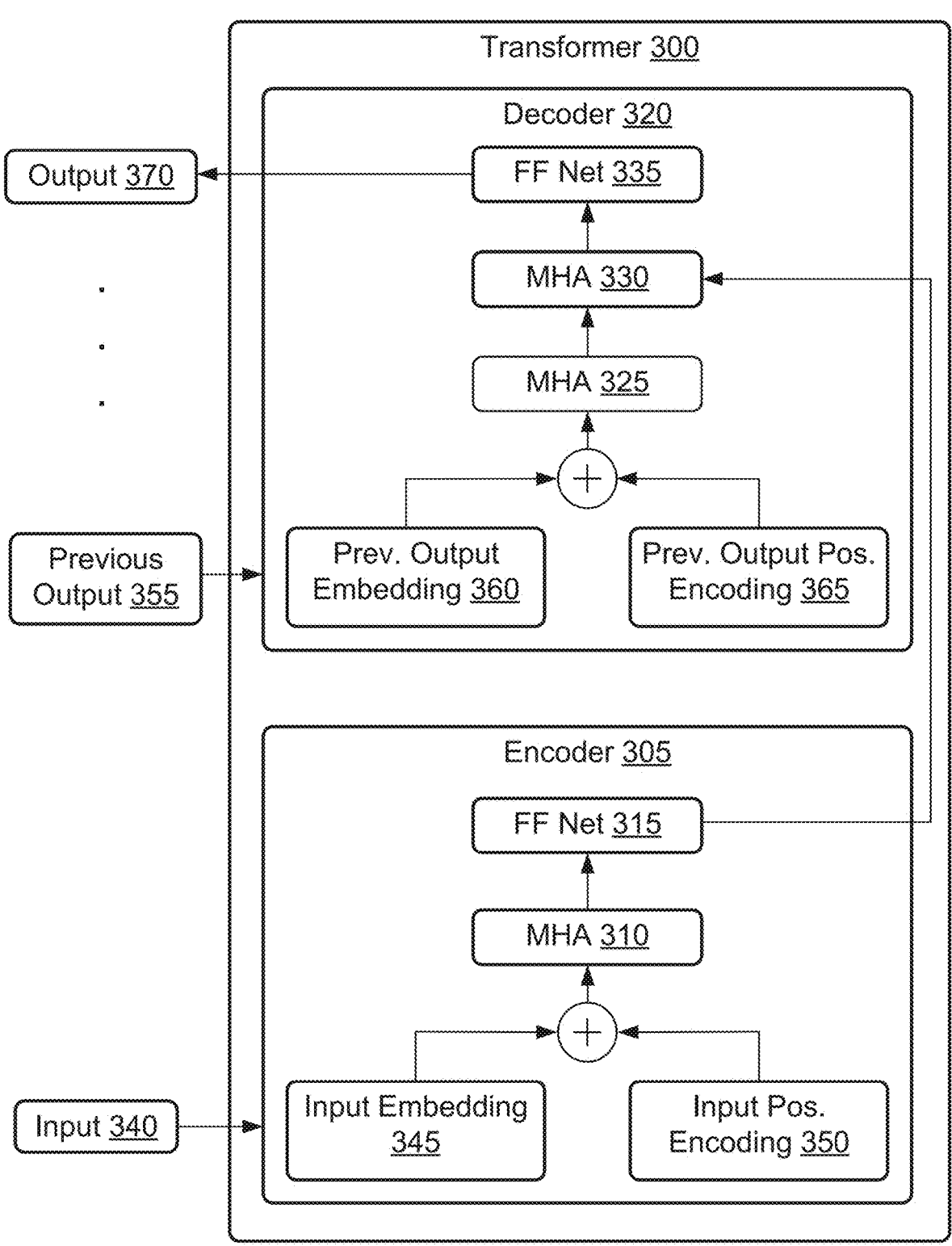
FIG. 3 shows an example of a transformer according to aspects of the present disclosure.

Further detail regarding the architecture of data processing apparatus 115 is provided with reference to FIGS. 2-4. Further detail regarding a process for generating a response to a query using a machine learning model is provided with reference to FIGS. 5-11.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet.

Some large cloud networks have functions distributed over multiple locations from central servers. A server is designated an edge server if it has a direct or close connection to a user. In some cases, cloud 120 is limited to a single organization. In other examples, cloud 120 is available to many organizations.

In one example, cloud 120 includes a multi-layer communications network comprising multiple edge routers and core routers. In another example, cloud 120 is based on a local collection of switches in a single physical location. According to some aspects, cloud 120 provides communications between user device 110, data processing apparatus 115, and database 125.

Database 125 is an example of, or includes aspects of, the corresponding element described with reference to FIG. 2. Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to data processing apparatus 115 and communicates with data processing apparatus 115 via cloud 120. According to some aspects, database 125 is included in data processing apparatus 115.

FIG. 2 shows an example of a data processing apparatus 200 according to aspects of the present disclosure. Data processing apparatus 200 is an example of, or includes aspects of, the corresponding element described with reference to FIGS. 1 and 3-4. In one aspect, data processing apparatus 200 includes processor unit 205, memory unit 210, query component 215, metadata component 220, machine learning model 225, database 230, and user interface 235.

Processor unit 205 includes at least one processor. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some aspects, processor unit 205 includes special purpose components for modem processing, baseband processing, digital signal processing, or transmission processing.

Memory unit 210 includes at least one memory device. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 205 to perform various functions described herein.

In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, in some cases, the memory controller includes a row decoder, column decoder, or both. In some cases, memory cells within memory unit 210 store information in the form of a logical state.

Query component 215 is an example of, or includes aspects of, the corresponding element described with reference to FIG. 3. According to some aspects, query component 215 is implemented as software stored in memory unit 210 and executable by processor unit 205, as firmware, as at least one hardware circuit, or as a combination thereof.

According to some aspects, query component 215 is configured to obtain a query relating to a document. According to some aspects, query component 215 is configured to selectively retrieve at least one of a plurality of portions of the document based on a retrieval command. In some examples, query component 215 identifies a context window size of machine learning model 225. In some examples, query component 215 selects the at least one of the set of portions of the document based on the context window size. In some examples, query component 215 generates a retrieval command prompt including a predefined set of retrieval command categories.

Metadata component 220 is an example of, or includes aspects of, the corresponding element described with reference to FIG. 3. According to some aspects, metadata component 220 is implemented as software stored in memory unit 210 and executable by processor unit 205, as firmware, as at least one hardware circuit, or as a combination thereof.

According to some aspects, metadata component 220 is configured to identify metadata for the document based on the query. In some cases, the metadata describes a structure including a set of portions of the document. In some examples, metadata component 220 generates a hierarchical tree of structural elements based on text of the document. In some cases, the metadata includes the hierarchical tree.

Machine learning model 225 is an example of, or includes aspects of, the corresponding element described with reference to FIGS. 3-4. According to some aspects, machine learning model 225 is implemented as software stored in memory unit 210 and executable by processor unit 205, as firmware, as at least one hardware circuit, or as a combination thereof. According to some aspects, machine learning model 225 comprises machine learning parameters stored in memory unit 210.

Machine learning parameters, also known as model parameters or weights, are variables that provide a behavior and characteristics of a machine learning model. In some cases, machine learning parameters are learned or estimated from training data and are used to make predictions or perform tasks based on learned patterns and relationships in the data.

In some cases, machine learning parameters are adjusted during a training process to minimize a loss function or maximize a performance metric. In some cases, a goal of the training process is to find optimal values for the parameters that allow the machine learning model to make accurate predictions or perform well on the given task.

For example, in some cases, during the training process, an algorithm adjusts machine learning parameters to minimize an error or loss between predicted outputs and actual targets according to optimization techniques like gradient descent, stochastic gradient descent, or other optimization algorithms. In some cases, once the machine learning parameters are learned from the training data, the machine learning parameters are used to make predictions on new, unseen data.

Artificial neural networks (ANNs) have numerous parameters, including weights and biases associated with each neuron in the network, which control a degree of connections between neurons and influence the ANN's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, the node processes the signal and then transmits the processed signal to other connected nodes.

In some cases, the signals between nodes comprise real numbers, and the output of each node is computed by a function of the sum of the inputs of each node. In some examples, nodes determine the output using other mathematical algorithms, such as selecting the max from the inputs as the output, or any other suitable algorithm for activating the node. In some cases, each node and edge are associated with at least one node weight that determines how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to increase the accuracy of the result (e.g., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some cases, machine learning model 225 comprises at least one ANN trained to generate text in response to a natural language query. For example, in some cases, machine learning model 225 comprises a large language model. In some cases, a large language model is trained to understand and generate human-like text based on large amounts of data. In some cases, by analyzing input text data, a large language model learns patterns and structures of human language.

In some cases, machine learning model 225 includes one or more transformers. In some cases, the one or more transformers are implemented as the large language model. In some cases, a transformer comprises one or more ANNs comprising attention mechanisms that enable the transformer to weigh an importance of different words or tokens within a sequence. In some cases, a transformer processes entire sequences simultaneously in parallel, making the transformer highly efficient and allowing the transformer to capture long-range dependencies more effectively.

In some cases, a transformer comprises an encoder-decoder structure. In some cases, the encoder of the transformer processes an input sequence and encodes the input sequence into a set of high-dimensional representations. In some cases, the decoder of the transformer generates an output sequence based on the encoded representations and previously generated tokens. In some cases, the encoder and the decoder are composed of multiple layers of self-attention mechanisms and feed-forward ANNs.

In some cases, the self-attention mechanism allows the transformer to focus on different parts of an input sequence while computing representations for the input sequence. In some cases, the self-attention mechanism captures relationships between words of a sequence by assigning attention weights to each word based on a relevance to other words in the sequence, thereby enabling the transformer to model dependencies regardless of a distance between words.

An attention mechanism is a key component in some ANN architectures, particularly ANNs employed in natural language processing (NLP) and sequence-to-sequence tasks, which allows an ANN to focus on different parts of an input sequence when making predictions or generating output.

NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. In some cases, these models express the relative probability of multiple answers.

Some sequence models (such as recurrent neural networks) process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

In some cases, an ANN employing an attention mechanism receives an input sequence and maintains the current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

In some cases, by incorporating an attention mechanism, an ANN dynamically allocates attention to different parts of the input sequence, allowing the ANN to focus on relevant information and capture dependencies across longer distances.

In some cases, calculating attention involves three basic steps. First, a similarity between a query vector Q and a key vector K obtained from the input is computed to generate attention weights. In some cases, similarity functions used for this process include dot product, splice, detector, and the like. Next, a softmax function is used to normalize the attention weights. Finally, the attention weights are weighed together with their corresponding values V. In the context of an attention network, the key K and value V are vectors or matrices that are used to represent the input data. The key K is used to determine which parts of the input the attention mechanism should focus on, while the value V is used to represent the actual data being processed. An example of a transformer is described in further detail with reference to FIG. 3.

According to some aspects, machine learning model 225 generates a retrieval command based on the query and the metadata. In some examples, machine learning model 225 generates the retrieval command based on the retrieval command prompt. In some examples, machine learning model 225 generates a response to the query based on the at least one of the set of portions of the document.

Database 230 is an example of, or includes aspects of, the corresponding element described with reference to FIG. 1. According to some aspects, database 230 includes a document stored in memory unit 210.

According to some aspects, user interface 235 is implemented as software stored in memory unit 210 and executable by processor unit 205. According to some aspects, user interface 235 is provided on a user device (such as the user device described with reference to FIG. 1) by data processing apparatus 200. According to some aspects, user interface 235 comprises a graphical user interface (a "GUI"), a text-based user interface, or a combination thereof. In some cases, user interface 235 allows a user to interact with data processing apparatus 200 by manipulating graphical elements such as windows, buttons, menus, text boxes, and scroll bars using devices such as a mouse, touchpad, touchscreen, or keyboard. In some cases, user interface 235 is configured to receive and/or display the query, the document, or a combination thereof. In some cases, user interface 235 is configured to display the response to the query.

FIG. 3 shows an example of a transformer 300 included in a machine learning model of a data processing apparatus (such as the machine learning model described with reference to FIGS. 2 and 4) according to aspects of the present disclosure. The example shown includes transformer 300, encoder 305, decoder 320, input 340, input embedding 345, input positional encoding 350, previous output 355, previous output embedding 360, previous output positional encoding 365, and output 370.

In some cases, encoder 305 includes multi-head self-attention sublayer 310 and feed-forward network sublayer 315. In some cases, decoder 320 includes first multi-head self-attention sublayer 325, second multi-head self-attention sublayer 330, and feed-forward network sublayer 335.

In some cases, encoder 305 is configured to map input 340 (for example, a query or a prompt comprising a sequence of words or tokens) to a sequence of continuous representations that are fed into decoder 320. In some cases, decoder 320 generates output 370 (e.g., a prediction of an output sequence of words or tokens) based on the output of encoder 305 and previous output 355 (e.g., a previously predicted output sequence), which allows for the use of autoregression.

For example, in some cases, encoder 305 parses input 340 into tokens and vectorizes the parsed tokens to obtain input embedding 345, and adds input positional encoding 350 (e.g., positional encoding vectors for input 340 of a same dimension as input embedding 345) to input embedding 345. In some cases, input positional encoding 350 includes information about relative positions of words or tokens in input 340.

In some cases, encoder 305 comprises one or more encoding layers (e.g., six encoding layers) that generate contextualized token representations, where each representation corresponds to a token that combines information from other input tokens via self-attention mechanism. In some cases, each encoding layer of encoder 305 comprises a multi-head self-attention sublayer (e.g., multi-head self-attention sublayer 310). In some cases, the multi-head self-attention sublayer implements a multi-head self-attention mechanism that receives different linearly projected versions of queries, keys, and values to produce outputs in parallel. In some cases, each encoding layer of encoder 305 also includes a fully connected feed-forward network sublayer (e.g., feed-forward network sublayer 315) comprising two linear transformations surrounding a Rectified Linear Unit (ReLU) activation:

$$FFN(x) = ReLU(W_1 x + b_1)W_2 + b_2 \qquad (1)$$

In some cases, each layer employs different weight parameters ($W_1$, $W_2$) and different bias parameters ($b_1$, $b_2$) to apply a same linear transformation each word or token in input 340.

In some cases, each sublayer of encoder 305 is followed by a normalization layer that normalizes a sum computed between a sublayer input x and an output sublayer(x) generated by the sublayer:

$$layernorm\,(x + sublayer\,(x)) \qquad (2)$$

In some cases, encoder 305 is bidirectional because encoder 305 attends to each word or token in input 340 regardless of a position of the word or token in input 340.

In some cases, decoder 320 comprises one or more decoding layers (e.g., six decoding layers). In some cases, each decoding layer comprises three sublayers including a first multi-head self-attention sublayer (e.g., first multi-head self-attention sublayer 325), a second multi-head self-attention sublayer (e.g., second multi-head self-attention sublayer 330), and a feed-forward network sublayer (e.g., feed-forward network sublayer 335). In some cases, each sublayer of decoder 320 is followed by a normalization layer that normalizes a sum computed between a sublayer input x and an output sublayer(x) generated by the sublayer.

In some cases, decoder 320 generates previous output embedding 360 of previous output 355 and adds previous output positional encoding 365 (e.g., position information for words or tokens in previous output 355) to previous output embedding 360. In some cases, each first multi-head self-attention sublayer receives the combination of previous output embedding 360 and previous output positional encoding 365 and applies a multi-head self-attention mechanism to the combination. In some cases, for each word in an input sequence, each first multi-head self-attention sublayer of decoder 320 attends only to words preceding the word in the sequence, and so transformer 300's prediction for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 305 by receiving a query Q from a previous sublayer of decoder 320 and a key K and a value V from the output of encoder 305, allowing decoder 320 to attend to each word in the input 340.

In some cases, each feed-forward network sublayer implements a fully connected feed-forward network similar to feed-forward network sublayer 315. In some cases, the feed-forward network sublayers are followed by a linear transformation and a softmax to generate a prediction of output 370 (e.g., a prediction of a next word or token in a sequence of words or tokens). Accordingly, in some cases, transformer 300 generates a response as described herein based on a predicted sequence of words or tokens.

FIG. 4 shows an example of data flow in a data processing apparatus 400 according to aspects of the present disclosure. Data processing apparatus 400 is an example of, or includes aspects of, the corresponding element described with reference to FIGS. 1-3. In one aspect, data processing apparatus 400 includes query component 405, metadata component 410, and machine learning model 415. Query component 405 is an example of, or includes aspects of, the corresponding element described with reference to FIG. 2. Metadata component 410 is an example of, or includes aspects of, the corresponding element described with reference to FIG. 2. Machine learning model 415 is an example of, or includes aspects of, the corresponding element described with reference to FIGS. 2-3.

Referring to FIG. 4, according to some aspects, query component 405 provides a query and a document to metadata component 410 as described with reference to FIG. 6. In some cases, metadata component 410 generates metadata based on the query and/or the document as described with reference to FIG. 6 and provides the metadata to query component 405. In some cases, query component 405 generates a retrieval command prompt based on the query and the metadata as described with reference to FIG. 6 and provides the retrieval command prompt to machine learning model 415. In some cases, machine learning model 415 generates a retrieval command based on the retrieval command prompt as described with reference to FIG. 6 and provides the retrieval command to query component 405.

In some cases, query component 405 retrieves at least a portion of the document based on the retrieval command as described with reference to FIG. 6 and provides the portion of the document to machine learning model 415. In some cases, machine learning model 415 generates a response based on the query and the retrieved portion of the document as described with reference to FIG. 6.

Data Processing

A method for data processing is described with reference to FIGS. 5-11. One or more aspects of the method include obtaining a query relating to a document; identifying metadata for the document based on the query, wherein the metadata describes a structure including a plurality of portions of the document; generating, using a machine learning model, a retrieval command based on the query and the metadata; selectively retrieving at least one of the plurality of portions of the document based on the retrieval command; and generating, using the machine learning model, a response to the query based on the at least one of the plurality of portions of the document.

In some aspects, the query specifies the portion of the document. In some aspects, the metadata comprises a hierarchical tree of structural elements included in the document. In some aspects, the machine learning model is trained to generate text in response to a natural language query.

Some examples of the method further include generating the hierarchical tree of structural elements based on text of the document. Some examples of the method further include identifying a context window size of the machine learning model. Some examples further include selecting the at least one of the plurality of portions of the document based on the context window size. Some examples of the method further include generating a retrieval command prompt including a predefined set of retrieval command categories, wherein the retrieval command is generated based on the retrieval command prompt.

FIG. 5 shows an example of a method 500 for retrieving a portion of a document according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, a conventional data processing system may attempt to answer a user query relating to a document by providing the entire document to a comparative large language model as context, and instructing the comparative large learning model to answer the query given the entire-document context. However, the document may include too many words to fit inside the comparative large language model's context window (e.g., a number of words that the large language model can accurately process at a time), and the comparative large language model may accordingly fail to provide an accurate answer to the query.

By contrast, some embodiments of the present disclosure retrieve a portion of a document based on a query relating to the document, and generate a response to the query via a machine learning model that uses the retrieved portion of the document as context. In some cases, because only the portion of the document is needed as context to answer the query, and because the retrieved portion of the document fits within the context window of the machine learning model, the machine learning model is able to generate an accurate response to the query.

At operation 505, a user provides a query and a document. In some cases, the operations of this step refer to, or may be performed by, a user as described with reference to FIG. 1. For example, in some cases, the user provides the query and the document to a data processing apparatus as described with reference to FIG. 6.

At operation 510, the system retrieves a portion of the document based on the query. In some cases, the operations of this step refer to, or may be performed by, a data processing apparatus as described with reference to FIGS. 1-4. For example, in some cases, the data processing apparatus retrieves the portion of the document as described with reference to FIG. 6.

At operation 515, the system generates a response to the query based on the portion of the document. In some cases, the operations of this step refer to, or may be performed by, a data processing apparatus as described with reference to FIGS. 1-4. For example, in some cases, the data processing apparatus generates the response as described with reference to FIG. 6. In some cases, the data processing apparatus displays the response to the user as described with reference to FIG. 6.

FIG. 6 shows an example of a method 600 for responding to a query relating to a document according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, some embodiments of the present disclosure provide an accurate response to a user query relating to a document by generating, using a machine learning model, a retrieval command for retrieving at least one portion of the document, selectively retrieving the at least one portion of the document based on the retrieval command and metadata for the document, and generating, using the machine learning model, the response based on the retrieved portion of the document.

In some cases, using the machine learning model to generate the retrieval command enables a relevant portion of the document to be retrieved without human supervision or intervention, which increases an efficiency of the response generation process. Furthermore, in some cases, the document includes more words than a context window size of the machine learning model. In some cases, because the response is generated based on the retrieved portion of the document, rather than the entire document, the machine learning model processes a number of words that fit within the context window size of the machine learning model, using an identified salient context, thereby increasing an accuracy of the response.

At operation 605, the system obtains a query relating to a document. In some cases, the operations of this step refer to, or may be performed by, a query component as described with reference to FIGS. 2 and 4.

For example, in some cases, a user (such as the user described with reference to FIG. 1) provides a query to the query component (such as the data processing apparatus described with reference to FIGS. 1-4) via a user interface provided on a user device (such as the user device described with reference to FIG. 1) by the data processing apparatus. In some cases, the query comprises text. In some cases, the query specifies a portion of the document. In some cases, the query specifies portions of the document. Examples of a query relating to a document include "Can you summarize the key takeaways from pages 5-7?" and "What year in table 3 has the maximum revenue?". An example of a query is described with reference to FIG. 8.

As used herein, a "document" is a data file including text. For example, in some cases, the document is a PDF file, a TXT file, a DOC file, an HTML file, a presentation file, or any other file type that is capable of including text. In some cases, the document is a structed document. As used herein, a "structured document" is a document that includes at least one structural element. As used herein, a "structural element" refers to a document-identified discrete portion of a document. Examples of a structural element include a section, a table, a figure, a paragraph, a page, and the like.

In some cases, the user provides the document to the query component via the user interface (for example, by uploading the document). In some cases, the user provides a command to the query component (for example, by a drop-down user interface element) to retrieve the document from a database (such as the database described with reference to FIGS. 1-2) or another data source (such as by providing a URL or other link to the user interface). In some cases, the query includes the document. In some cases, a number of words included in the document exceeds a context window size of the machine learning model.

According to some aspects, the query relates to two or more documents. In some cases, the user provides the documents to the query component via the user interface (for example, by uploading the documents), provides a command to the query component (for example, by a drop-down user interface element) to retrieve the documents from a database (such as the database described with reference to FIGS. 1-2), or a combination thereof. In some cases, the query includes the two or more documents. In some cases, a number of words included in the two or more documents exceed the context window size of the machine learning model.

At operation 610, the system identifies metadata for the document based on the query, where the metadata describes a structure including a set of portions of the document. In some cases, the operations of this step refer to, or may be performed by, a metadata component as described with reference to FIGS. 2 and 4.

According to some aspects, the query component provides the query and/or the document(s) to the metadata component. In some cases, the metadata component converts the document(s) into a tree structure (such as an HTML-like tree). In some cases, the metadata component extracts at least one structural element from the tree structure. In some cases, the metadata component uses an API call to an external server to extract the at least one structural element.

According to some aspects, the metadata component obtains the metadata by respectively generating a hierarchical tree of structural elements included in each document. For example, in some cases, the metadata component generates a hierarchical tree including the at least one structural element included in the document based on the at least one extracted structural element. In some cases, the hierarchical tree includes location metadata corresponding to a location of the at least one structural element in the document, such as at least one of a page number, a paragraph number, or the like. In some cases, the metadata includes the hierarchical tree(s). An example of a hierarchical tree of structural elements included in a document is described with reference to FIG. 7.

According to some aspects, the metadata component maps the hierarchical tree into a structured representation of the document (e.g., a representation including formatted text). In some cases, the metadata includes the structured representation of the document(s). An example of a structured representation of a document is described with reference to FIG. 7.

At operation 615, the system generates a retrieval command based on the query and the metadata. In some cases, the operations of this step refer to, or may be performed by, a machine learning model as described with reference to FIGS. 2-4.

According to some aspects, the metadata component provides the metadata to the query component. In some cases, the query component generates a retrieval command prompt. In some cases, the retrieval command prompt includes the query. In some cases, the retrieval command prompt includes the metadata. In some cases, the retrieval command prompt includes a predefined set of retrieval command categories.

In some cases, the predefined set of retrieval command categories includes at least one function that can be called to retrieve at least one portion of the document based on the function. An example of a retrieval command prompt is described with reference to FIG. 8. Examples of functions included in a predefined set of retrieval command categories are described with reference to FIG. 9.

In some cases, the retrieval command prompt includes a definition of the function. In some cases, the retrieval command prompt includes an instruction to generate a retrieval command including at least one function and an argument for the function, where the argument indicates a corresponding portion of the document, based on the query and the definition of the at least one function. In some cases, the retrieval command prompt includes an instruction to select the at least one function based on the metadata.

According to some aspects, the machine learning model generates the retrieval command based on the retrieval command prompt. For example, in some cases, the query component provides the retrieval command prompt to the machine learning model. In some cases, the machine learning model selects at least one function of the set of predefined retrieval command categories based on the query. In some cases, the machine learning model selects at least one function of the set of predefined retrieval command categories based on the definition of the at least one function. In some cases, the retrieval command includes the at least one function and the argument for the function.

In an example, a retrieval command prompt includes a query "Can you summarize the key takeaways from pages 5-7?", a set of predefined retrieval command categories including the functions "fetch_pages", "fetch_sections", "fetch_figure", "fetch_table", and "retrieve", and an instruction to generate a retrieval command including at least one function and an argument for the at least one function. In some cases, the retrieval command prompt includes respective definitions of the functions (e.g., "Get the text contained in the pages listed", "Get the text contained in the section listed", "Get the text contained in the figure caption listed", "Get the text contained in the table caption listed", and "Issue a natural language query over the document, and fetch relevant chunks").

In the example, the machine learning model determines, based on the query, the set of predefined retrieval command categories, and the instruction to generate a retrieval command including at least one function and an argument for the at least one function, that the function fetch_pages, applied to pages 5, 6, and 7, should be called, and therefore generates a retrieval command "fetch_pages(pages: [5, 6, 7])".

In some cases, the machine learning model generates an argument of the retrieve function by reformulating the query to make the query more helpful. For example, in some cases, the machine learning model filters out stop words from the query to generate the argument. In an example, given a query "What benefits do I get if I am fired?", the machine learning model generates a retrieval command including "retrieve("termination benefits")".

In a further example, the retrieval command prompt includes an instruction to select the at least one function based on the metadata. In the further example, the machine learning model determines based on the metadata that the document includes each of a page 5, a page 6, and a page 7, determines that "Can you summarize the key takeaways from pages 5-7?" is therefore a valid query, and generates the retrieval command "fetch_pages(pages: [5, 6, 7])" based on the determination.

In some cases, the document includes information on a topic in a particular section or page, but also interspersed elsewhere within the document. According to some aspects, to help to accurately generate a response for a query relating to such topics, the machine learning model determines based on the query that two or more functions are relevant, and generates a retrieval command including the two or more functions and respective arguments for the two or more functions as a "compose function". In an example, given a query "What benefits do I get if I am fired?" for a document, and the metadata for the document, the machine learning model generates a compose function "retrieve('termination benefits)', fetch_section('5. Termination Benefits'), fetch_pages(3)."

According to some aspects, the retrieval command prompt includes a role instruction. In some cases, the role instruction is a description of a role that the machine learning model is expected to fulfill. An example role instruction is "You are an expert document question answering system. You answer questions by finding relevant content in the document and answering questions based on the document".

At operation 620, the system selectively retrieves at least one of the set of portions of the document based on the retrieval command. In some cases, the operations of this step refer to, or may be performed by, a query component as described with reference to FIGS. 2 and 4.

For example, in some cases, the machine learning model provides the retrieval command to the query component. In some cases, the query component executes the function included in the retrieval command and, responsive to executing the function(s), parses the metadata for the document(s) (for example, the hierarchical tree(s), the structured representation(s), or a combination thereof) to retrieve the portion(s) of the document(s) indicated by the argument of the function. In some cases, the query component provides the retrieved portion(s) of the document(s) to the machine learning model. In some cases, responsive to executing a "retrieve" function, the query component performs a semantic search on the document text according to the argument for the "retrieve" function.

According to some aspects, responsive to a retrieval command including a compose function, the query component executes each function included in the compose function (e.g., sequentially) to retrieve a portion of a document. In some cases, the query component concatenates each retrieved portion of the document. In some cases, the query component prepends or prefixes each portion of the document respectively retrieved based on each function with a context string respectively corresponding to the function. In some cases, the context string helps the machine learning model to disambiguate the portions of the document retrieved based on each respective function. Examples of context strings and corresponding functions are described with reference to FIG. 10. In some cases, the query component provides the portions of the document and the context strings to the machine learning model.

According to some aspects, the query component identifies a context window size of the machine learning model. As used herein, a "context window size" refers to a number of words taken into consideration when a machine learning model analyzes or predicts a word within a sequence of text (e.g., a range of words around a target word that the machine learning model looks at to understand the meaning of the word, or to predict a word in the range of words). For instance, given a context window size of five, the machine learning model would consider the five words before and after a target word in an input sentence. In some cases, the query component identifies the context window size of the machine learning model based on information stored in the database (e.g., parameters of the machine learning model).

In some cases, the query component selects the at least one of the set of portions of the document based on the context window size. For example, in some cases, the query component determines that a number of words included in the retrieved portion(s) of the document(s) is within (e.g., less than) the context window size of the machine learning model, and provides the retrieved portion(s) of the document(s) to the machine learning model based on the determination. In some cases, the query component determines that the number of words included in the retrieved portion(s) of the document(s) is outside of (e.g., larger than) the context window size of the machine learning model, and responsive to the determination displays, via the user interface, a message to the user that the query may not receive a fully accurate response.

At operation 625, the system generates a response to the query based on the at least one of the set of portions of the document. In some cases, the operations of this step refer to, or may be performed by, a machine learning model as described with reference to FIGS. 2-4. For example, in some cases, responsive to receiving the retrieved portions(s) of the document(s) from the query component and/or the context strings, the machine learning model generates the response to the query based on the retrieved portion(s) of the document(s). An example of retrieved portions of a document are described with reference to FIG. 11. An example of a response to a query is described with reference to FIG. 11.

Figure 7:
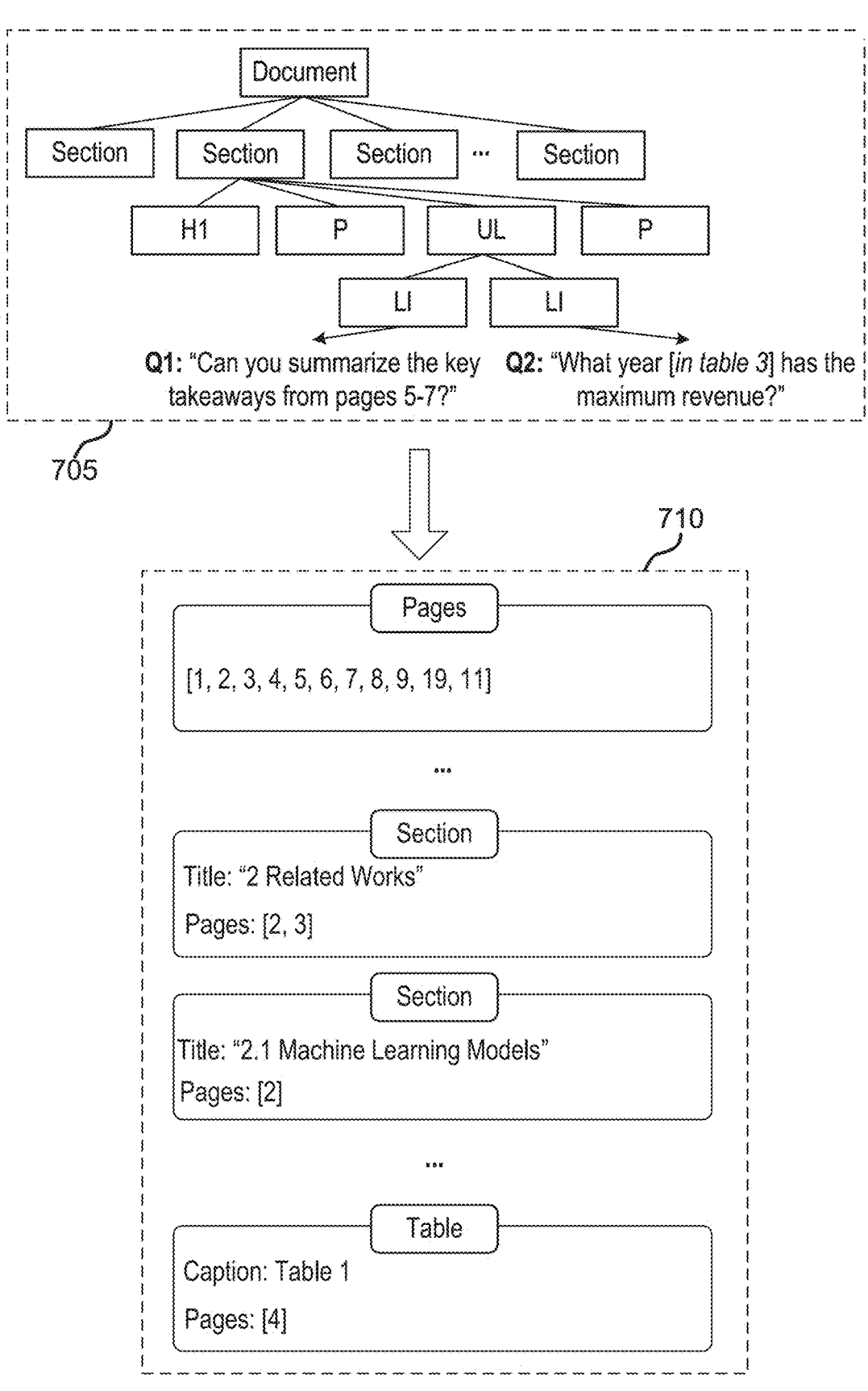
FIG. 7 shows an example of generating a structured metadata representation of a document according to aspects of the present disclosure.

FIG. 7 shows an example 700 of generating a structured metadata representation of a document according to aspects of the present disclosure. The example shown includes hierarchical tree 705 and structured representation 710. Structured representation 710 is an example of, or includes aspects of, the corresponding element described with reference to FIG. 8. Referring to FIG. 7, hierarchical tree 705 is generated based on a document by a metadata component as described with reference to FIG. 6, and structured representation 710 is generated by the metadata component based on hierarchical tree 705 as described with reference to FIG. 6.

Figure 8:
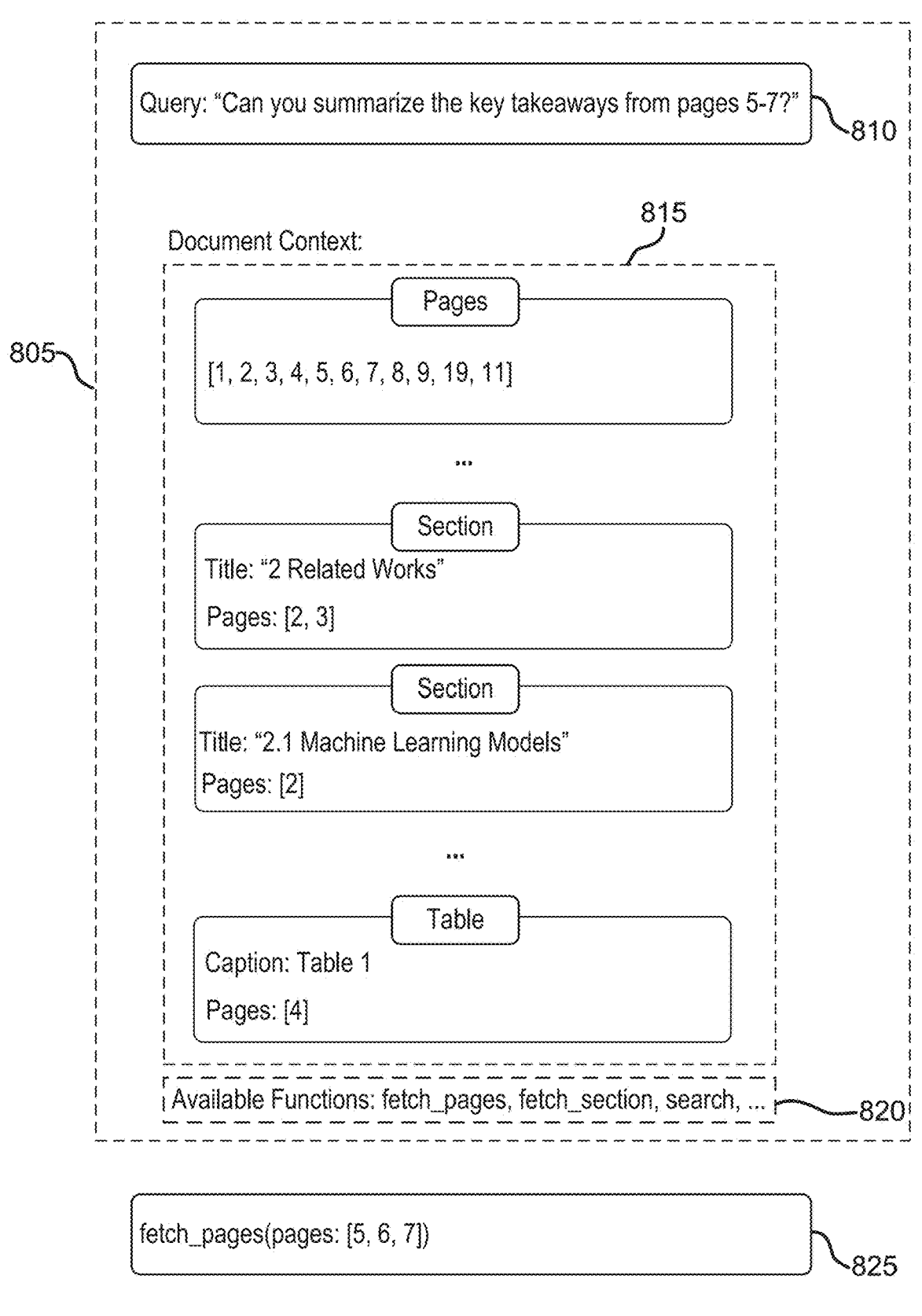
FIG. 8 shows an example of frame selection and/or filling according to aspects of the present disclosure.

FIG. 8 shows an example 800 of frame selection and/or filling according to aspects of the present disclosure. The example shown includes retrieval command prompt 805 and retrieval command 825. In one aspect, retrieval command prompt 805 includes query 810, structured representation 815, and predefined set of retrieval command categories 820. Query 810 is an example of, or includes aspects of, the corresponding element described with reference to FIG. 11. Structured representation 815 is an example of, or includes aspects of, the corresponding element described with reference to FIG. 8.

Referring to FIG. 8, in some cases, a query component (such as the query component described with reference to FIGS. 2 and 4) generates retrieval command prompt 805 including query 810, structured representation 815, and predefined set of retrieval command categories 820 responsive to receiving query 810. In some cases, structured representation 815 provides a document context. In some cases, a machine learning model (such as the machine learning model described with reference to FIGS. 2-4) generates retrieval command 825 based on retrieval command prompt 810. In some cases, the query component retrieves pages 5, 6, and 7 of a document based on retrieval command 825.

Figure 9:
FIG. 9 shows an example of a table of retrieval functions according to aspects of the present disclosure.

FIG. 9 shows an example of a table 900 of retrieval functions according to aspects of the present disclosure. Referring to FIG. 9, table 900 includes a set of functions included in a predefined set of retrieval command categories, and respectively corresponding descriptions of the functions.

FIG. 10 shows an example of a table 1000 of appended retrieval functions according to aspects of the present disclosure. Referring to FIG. 10, in some cases, a query component (such as the query component described with reference to FIGS. 2 and 4) prepends or prefixes each portion of a document respectively retrieved based on functions of a compose function with a respectively corresponding context string. In some cases, the context string helps the machine learning model to disambiguate the portions of the document retrieved based on each respective function. FIG. 10 shows functions and respectively corresponding context strings.

Figure 11:
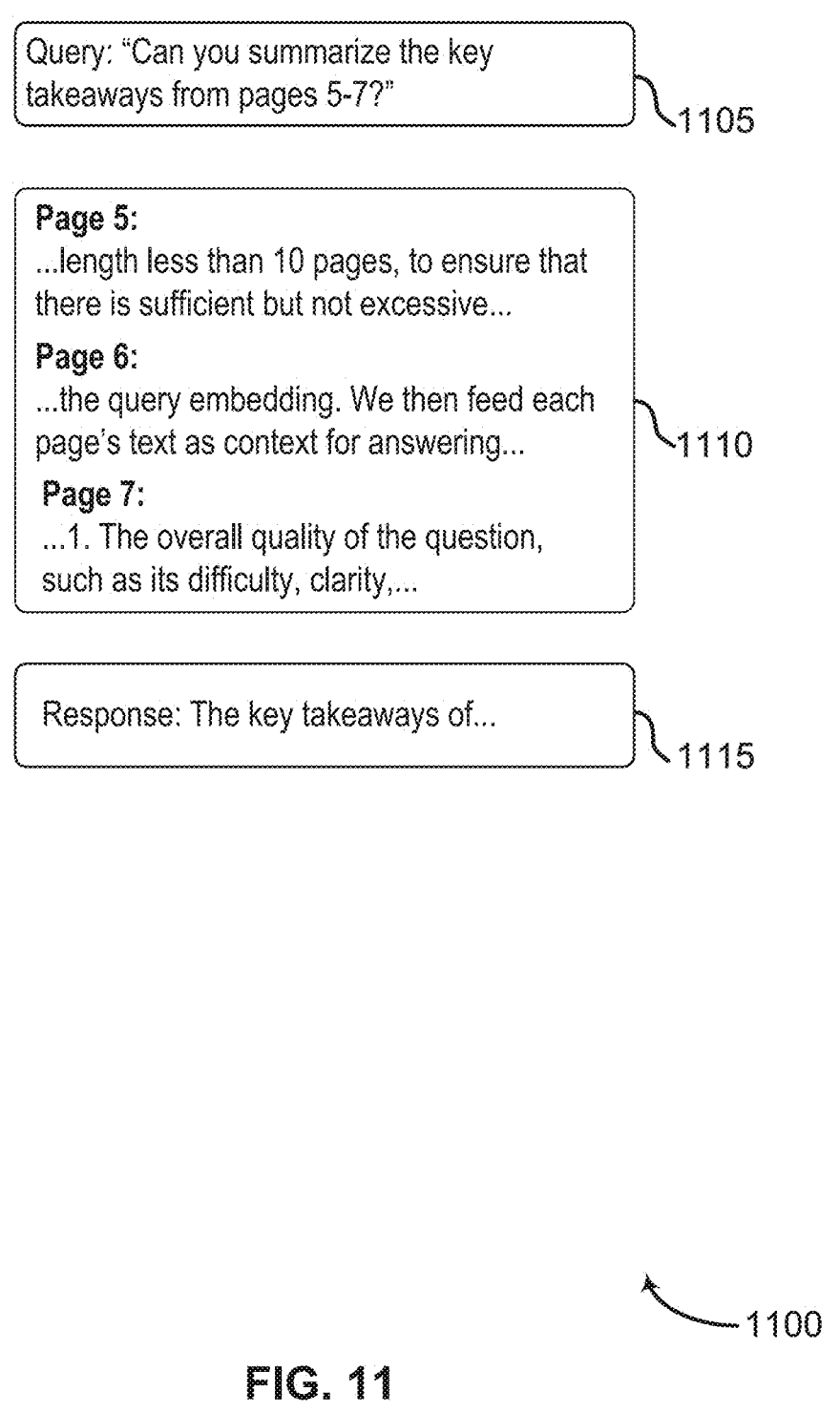

FIG. 11 shows an example 1100 of question answering with selected context according to aspects of the present disclosure. The example shown includes query 1105, portions of document 1110, and query response 1115. Query 1105 is an example of, or includes aspects of, the corresponding element described with reference to FIG. 8. Referring to FIG. 11, a query component (such as the query component described with reference to FIGS. 2 and 4) retrieves pages 5, 6, and 7 of a document based on query 1105 and a retrieval command generated by a machine learning model (such as the machine learning model described with reference to FIGS. 2-4) based on query 1105. Portions of document 1110 includes the retrieved pages 5, 6, and 7 of the document (shown to be elided for ease of illustration). The machine learning model generates query response 1115 (shown to be elided for ease of illustration) based on query 1105 and the retrieved portions of document 1110.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data processing, comprising:
   obtaining, from a computing device, a query relating to a document; and
   in response to the obtaining of the query from the computing device:

identifying, by a metadata component executed on a data processing system, metadata for the document based on the query, wherein the metadata describes a structure of the document including a plurality of portions of the document;

generating, by a query component executed on the data processing system, a retrieval command prompt, wherein the retrieval command prompt includes the query, the metadata, a plurality of executable functions, and an instruction to generate, based on the query and the metadata, a retrieval command including at least one executable function of the plurality of executable functions and an argument for the at least one executable function;

generating, by a language generation machine learning model of the data processing system executing an attention mechanism, the retrieval command based on the instruction by computing a first set of attention weights corresponding to the instruction, wherein the retrieval command is based on the first set of attention weights and includes an executable function of the plurality of executable functions and an argument generated by the language generation machine learning model for the executable function;

selectively retrieving at least one portion of the plurality of portions of the document based on a context window size of the language generation machine learning model of the data processing system executing the attention mechanism by executing the executable function according to the argument for the executable function;

generating, by the language generation machine learning model of the data processing system executing the attention mechanism, a response to the query based on the retrieved portion of the document by computing a second set of attention weights corresponding to the retrieved portion of the document, wherein the second set of attention weights is different from the first set of attention weights, wherein the retrieval command is based on the second set of attention weights, and wherein the response comprises natural language text; and displaying the response to a user via the computing device.

2. The method of claim 1, wherein: the query specifies the portion of the document.

3. The method of claim 1, wherein: the metadata comprises a hierarchical tree of structural elements included in the document.

4. The method of claim 3, wherein obtaining the metadata comprises: generating the hierarchical tree of structural elements based on text of the document.

5. The method of claim 1, wherein: the language generation machine learning model is trained to generate text in response to a natural language query.

6. A non-transitory computer readable medium storing instructions that, when executed by a processor, cause the processor to:

obtain, from a computing device, a query relating to a document; and in response to the obtaining of the query from the computing device:

identify, by a metadata component executed on a data processing system, metadata for the document based on the query, wherein the metadata describes a structure of the document including a plurality of portions of the document;

generate, by a query component executed on the data processing system, a retrieval command prompt, wherein the retrieval command prompt includes the query, the metadata, a plurality of executable functions, and an instruction to generate, based on the query and the metadata, a retrieval command including at least one executable function of the plurality of executable functions and an argument for the at least one executable function;

generate, by a language generation machine learning model of the data processing system executing an attention mechanism, the retrieval command based on the instruction by computing a first set of attention weights corresponding to the instruction, wherein the retrieval command is based on the first set of attention weights and includes an executable function of the plurality of executable functions and an argument generated by the language generation machine learning model for the executable function;

selectively retrieve at least one portion of the plurality of portions of the document based on a context window size of the language generation machine learning model of the data processing system executing the attention mechanism by executing the executable function according to the argument for the executable function;

generate, by the language generation machine learning model of the data processing system executing the attention mechanism, a response to the query based on the retrieved portion of the document by computing a second set of attention weights corresponding to the retrieved portion of the document and different from the first set of attention weights, wherein the retrieval command is based on the second set of attention weights and wherein the response comprises natural language text; and display the response to a user via the computing device.

7. The non-transitory computer readable medium of claim 6, wherein: the query specifies the portion of the document.

8. The non-transitory computer readable medium of claim 6, wherein: the metadata comprises a hierarchical tree of structural elements included in the document.

9. The non-transitory computer readable medium of claim 8, wherein the instructions further cause the processor to: generate the hierarchical tree of structural elements based on text of the document.

10. The non-transitory computer readable medium of claim 6, wherein: the language generation machine learning model is trained to generate text in response to a natural language query.

11. A data processing system, comprising:

a memory; and a processing device coupled to the memory, the processing device configured to perform operations comprising:

obtaining, from a computing device, a query relating to a document; and in response to the obtaining of the query from the computing device:

identifying, by a metadata component executed on a data processing system, metadata for the document based on the query, wherein the metadata describes a structure of the document including a plurality of portions of the document;

generating, by a query component executed on the data processing system, a retrieval command prompt, wherein the retrieval command prompt includes the query, the metadata, a plurality of executable functions, and an instruction to generate, based on the query and the metadata, a retrieval command including at least one executable function of the plurality of executable functions and an argument for the at least one executable function;

generating, by a language generation machine learning model of the data processing system executing an attention mechanism, the retrieval command based on the instruction by computing a first set of attention weights corresponding to the instruction, wherein the retrieval command is based on the first set of attention weights and includes an executable function of the plurality of executable functions and an argument generated by the language generation machine learning model for the executable function;

selectively retrieving at least one portion of the plurality of portions of the document based on a context window size of the language generation machine learning model of the data processing system executing the attention mechanism by executing the executable function according to the argument for the executable function;

generating, by the language generation machine learning model of the data processing system executing the attention mechanism, a response to the query based on the retrieved portion of the document by computing a second set of attention weights corresponding to the retrieved portion of the document, wherein the second set of attention weights is different from the first set of attention weights, wherein the retrieval command is based on the second set of attention weights, and wherein the response comprises natural language text; and displaying the response to a user via the computing device.

12. The system of claim 11, further comprising: a metadata component configured to identify the metadata for the document based on the query.

13. The system of claim 12, wherein the metadata component is further configured to: generate a hierarchical tree of structural elements based on text of the document.

* * * * *